Figure 1:
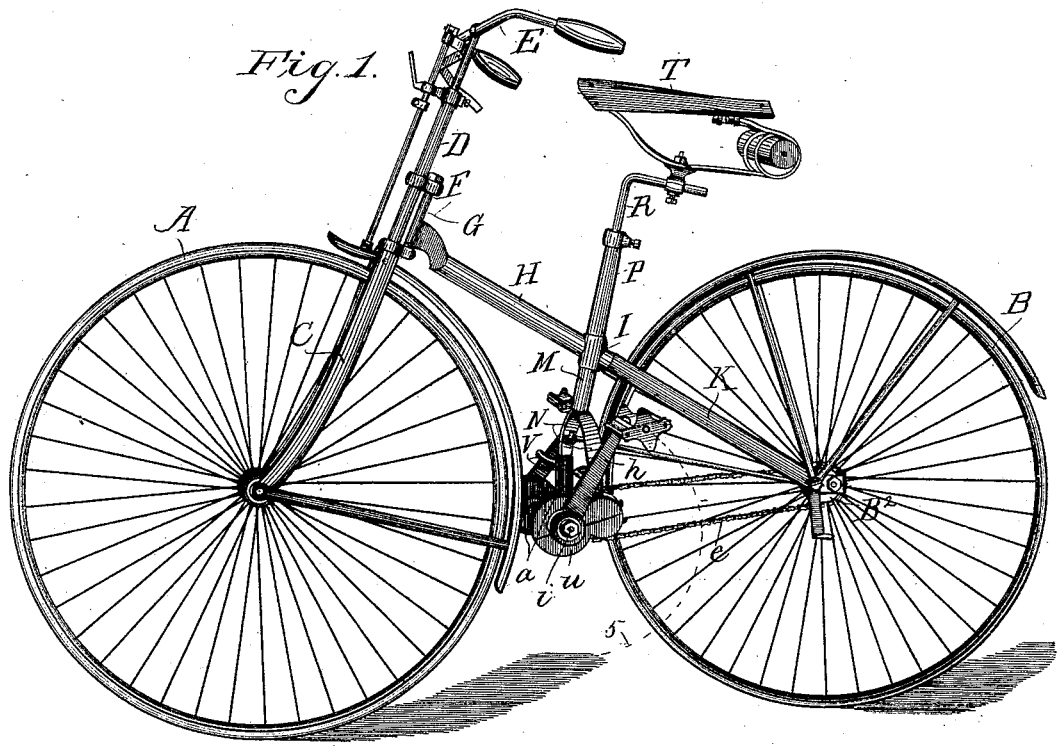

(No Model.) 2 Sheets—Sheet 1.

J. B. McCUNE & J. L. YOST.
BICYCLE.

No. 424,994. Patented Apr. 8, 1890.

Witnesses.
Jas. J. Maloney
M. E. Hill

Inventors,
Joseph B. McCune and
Joseph L. Yost
by Jo. P. Livermore
Atty.

(No Model.) 2 Sheets—Sheet 2.

J. B. McCUNE & J. L. YOST.
BICYCLE.

No. 424,994. Patented Apr. 8, 1890.

Witnesses,
Jas. J. Maloney
M. E. Heil

Inventors,
Joseph B. McCune
and Joseph L. Yost
by Jno. P. Livermore
Atty.

THE NORRIS PETERS CO., PHOTO-LITHO., WASHINGTON, D. C.

UNITED STATES PATENT OFFICE.

JOSEPH B. McCUNE AND JOSEPH L. YOST, OF EVERETT, MASSACHUSETTS.

BICYCLE.

SPECIFICATION forming part of Letters Patent No. 424,994, dated April 8, 1890.

Application filed June 18, 1889. Serial No. 314,753. (No model.)

*To all whom it may concern:*

Be it known that we, JOSEPH B. MCCUNE and JOSEPH L. YOST, of Everett, county of Middlesex, State of Massachusetts, have invented an Improvement in Bicycles, of which the following description, in connection with the accompanying drawings, is a specification, like letters on the drawings representing like parts.

Our invention relating to bicycles is embodied in a bicycle of the type now commonly known as a "safety-bicycle," having two wheels of comparatively small diameter, the front one of which has its bearings in a fork connected with a steering-handle bar and pivotally connected with a frame-work extending to the rear wheel, to which the driving-power is applied, said wheels being connected with pedals operated by the feet of the rider, whose saddle or seat is supported on the connecting-frame above and toward the front of the rear wheel.

The present invention relates, mainly, to details of construction of the frame-work and of the driving mechanism by which the power is transmitted from the pedals to the driving-wheel.

The driving mechanism has substantially the same principle of operation as that shown and described in Letters Patent No. 334,325, granted to Joseph L. Yost, January 12, 1886, reissued September 6, 1887, No. 10,864; but said actuating mechanism has important advantages when used in combination with a bicycle of the kind above referred to, in which the pedals, instead of being located at or near and connected directly with the hub of the driving-wheel, are placed at or near the periphery of the driving-wheel and connected by intermediate mechanism with the hub thereof.

In this invention the pedals are connected with oscillating levers instead of with the usual revolving cranks, and the said levers are connected with a hub or shaft by a clutch that engages in the movement of the levers in one direction only, so that the said hub rotates continuously in one direction, being impelled or actuated, however, only in the downward stroke of the levers, which are pivoted in front of the pedals, so that the latter move in an arc backward, downward, and then forward in making their driving-stroke. This feature is of great importance in a bicycle or vehicle in which the pedals and levers are near the ground, as the pedals move backward and upward from their position nearest the ground and in such movement have no positive connection with the driving mechanism, so that in case they should strike an obstacle they would readily yield and pass such obstacle without being damaged.

Another important advantage arises from the fact that the levers never move through an arc or semicircle in front of their pivotal points, so that the periphery of the front or steering wheel can be set back nearly to the axis upon which the levers oscillate, thus shortening the entire vehicle and making it more easy to control.

Figure 2:
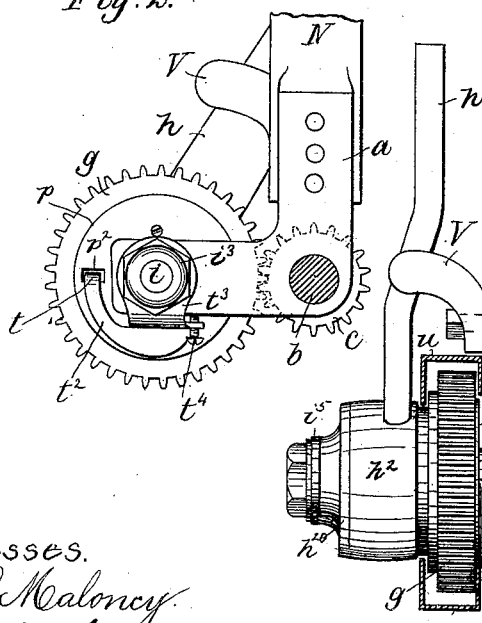
Figure 3:
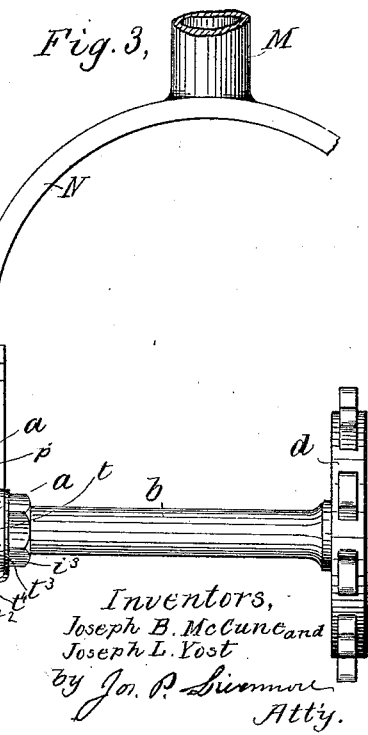
Figure 4:
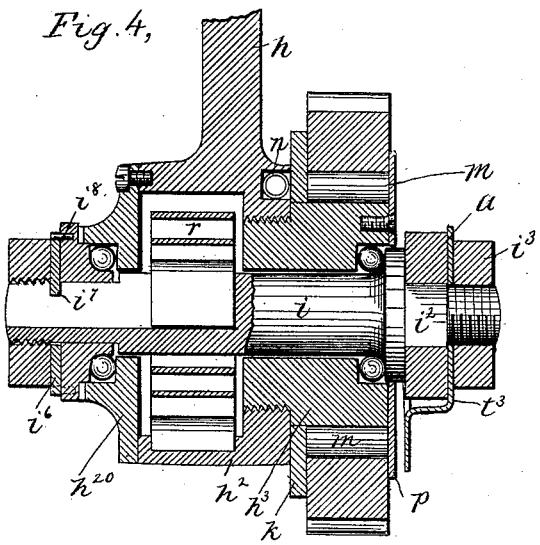
Figure 5:
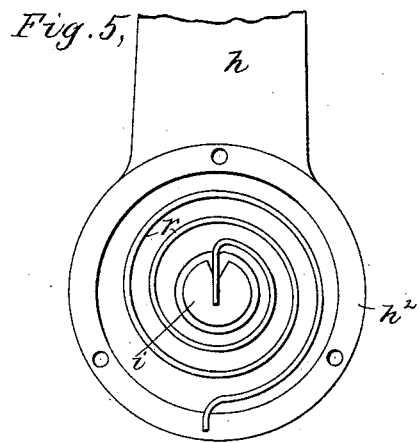
Figure 6:
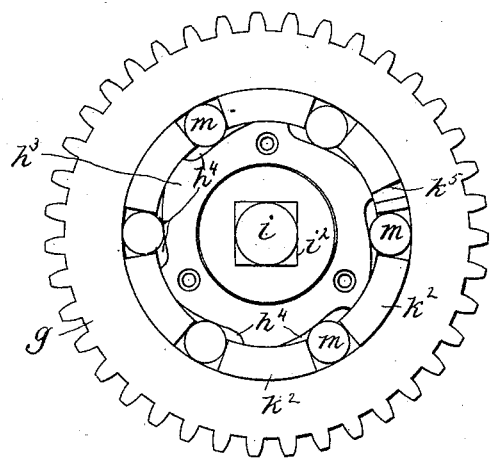
Figure 7:
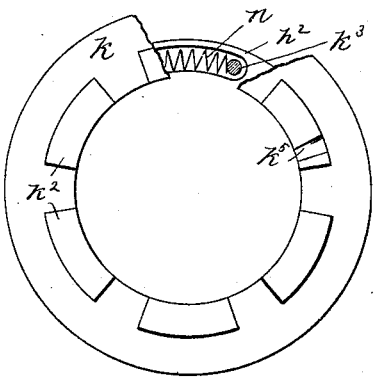
Figure 8:
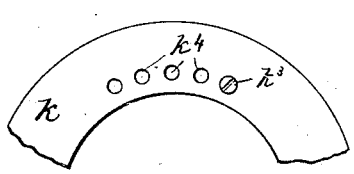

Figure 1 is a perspective view of a bicycle embodying this invention as seen looking directly toward the side of the same; Fig. 2, a side elevation of a portion of the driving mechanism, showing the face that is toward the middle of the machine; Fig. 3, a front elevation of a portion of the actuating mechanism and its supporting frame-work; Fig. 4, a longitudinal section on the axis of the actuating-lever of a portion of the driving mechanism; Fig. 5, an end elevation of the central or hub portion of the driving mechanism with its cap removed; Fig. 6, a side elevation of the opposite end of the driving mechanism with one of the inclosing-plates removed, showing the clutch-connection between the vibrating lever and continuously-rotating gear; Fig. 7, a rear elevation of a portion of the clutch mechanism detached; Fig. 8, a detail showing a portion of the opposite face of the ring or part represented in Fig. 7.

The general construction of the bicycle is represented in Fig. 1, it comprising a front or steering wheel A and a rear or driving wheel B, the front wheel having its bearings in the lower end of a fork C, the branches of which extend at each side of the wheel above the periphery of the wheel and are connected with a post D, provided with a steering-handle bar E. The said post is pivotally connected at F with a neck G at the forward end of the wheel-connecting frame, consisting of a tubular beam or backbone H, extending to a point I just outside the periphery of the the rear wheel B, from which point it is forked, the branches of the fork K extending to and supporting the bearings of the rear wheel B.

Rigidly connected with the wheel-connecting frame H K at the point I is a downwardly-projecting arm M, terminating at the lower end in a fork N, (see Fig. 3,) and an upwardly-extending post P, which receives the vertical adjustable support R of the saddle T. The said fork N has rigidly connected with the lower end of each branch an elbow-shaped bearing-piece $a$, the angle of which constitutes or is provided with bearings for a shaft or spindle $b$, extending across between the branches of said fork and at the front of the periphery of the rear wheel B of the vehicle. The said shaft $b$ is provided at each end with pinions or small gears $c$ (see Fig. 2) and also at one side, just within the corresponding branch of the fork N, with a sprocket-wheel $d$, connected by a chain $e$ (see Fig. 1) with a sprocket-wheel $B^2$ on the hub of the driving-wheel, so that when the said shaft $b$ is rotated it will also cause the wheel B to be rotated, so as to propel the vehicle. Power is applied to the shaft $b$ for the purpose of thus propelling the vehicle from gears $g$, meshing with the gears $c$, and of larger size than the latter, so that a single rotation of the gears $g$, produced by the actuating-levers $h$, as will be hereinafter described, causes a greater number of rotations of the shaft $b$, and consequently of the driving-wheel B, if the sprocket-wheel $d$ is equal in size to the one $B^2$ on the hub of the driving-wheel.

The speed of rotation of the driving-wheel may be further increased with relation to the angular movement of the levers $h$ by making the sprocket-wheel $d$ larger than the one on the driving-wheel; but it is one of the advantages of the actuating mechanism herein represented in a machine of this type that the multiplication of movement of the driving-wheel relative to the actuating-levers can be produced largely, if not wholly, by the difference in size of the gears $g$ and $c$, so that the sprocket-wheels may be nearly of equal diameter or the multiplication of speed may be distributed as desired between the toothed and chain gearing, instead of having to depend wholly on the sprocket and chain gearing, and thus requiring a comparatively large sprocket-wheel on the driving-shaft $b$, as is the case when power is applied directly to the driving-shaft by revolving cranks connected therewith.

As herein shown, the gear $g$ is about double the size of the gear $c$, so that a given angular movement of the lever $h$ produces double the angular movement of the shaft $b$, and consequently of the wheel B, if the sprockets connecting the said shaft and wheel are of equal size. The connection of the lever $h$ with the driving-gear $g$ is best shown in Figs. 4 to 8, inclusive. The said levers are provided around the axis of rotation with a hollow hub or boss $h^2$, having fastened upon its outer end a cap or cover $h^{20}$, and upon its inner end, or end toward the middle of the vehicle, a hub $h^3$, the said parts $h$ $h^2$ $h^3$ being all rigidly fastened together and moving as a single piece (hereinafter called for convenience the "lever-piece") upon a bearing piece or arbor $i$, fixed in the end of the elbow-shaped bearing-piece $a$, said arbor $i$ having a square portion $i^2$ fitting in a square socket in the piece $a$, to which it is securely fastened by a nut $i^3$ engaging with a threaded portion beyond the square part $i^2$. The cap $h^{20}$ and part $h^3$ have annular recesses bearing on anti-friction balls working in corresponding seats in the arbor $i$ and on an adjusting-nut $i^5$, connected therewith, and secured in properly-adjusted position by means of a washer $i^6$, having a tongue $i^7$, projecting into a groove in the arbor $i$, and a projection $i^8$, projecting into one of a number of notches or recesses formed around the periphery of the nut $i^5$, these parts being securely fastened when properly adjusted upon the arbor $i$ by a nut $i^9$.

The hub or projection $h^3$ of the lever-piece is provided with a number of inclined recesses $h^4$, (best shown in Fig. 6,) and has loosely fitted over it and so as to turn upon it a ring $k$, having a series of projections $k^2$, that fit within and form a bearing for the gear $g$, as clearly shown in Fig. 6, the said projections corresponding in number and position to the inclined recesses $h^4$ of the lever-piece and serving to confine between them a series of cylindrical rollers $m$, which are interposed between the inner periphery of the annular gear $g$ and the outer surface of the inclined recesses $h^4$ of the lever-piece, which are of such inclination as to form practically tapering pockets between the gear and lever-piece, so that when the said rollers are forced toward the narrower ends of said pockets they lock the gear and lever-piece together; but when the gear tends to rotate upon the lever-piece toward the wider end of the pockets it easily carries the rollers toward the wider ends of the pockets, and thus relieves the said pressure upon the rollers, permitting the gear to turn freely and independently of the lever-piece on the said rollers and on the projections $k^2$ of the ring $k$ as a bearing. The ring $k$ is acted upon by a spring $n$ (see Figs. 4 and 7) contained in a recess in the hub portion of the lever-piece and acting on a projection $k^3$ from the ring $k$, (see Figs. 7 and 8,) tending to move it in the direction to cause its projections $k^2$ to force the rollers $m$ toward the narrower ends of the pockets, so as to lock the said lever-piece to the gear, and the said spring and ring force all the said rollers simultaneously and uniformly, so that the locking action is evenly distributed among them. Thus when the lever-piece is turned in the direction of the arrow, Fig. 6, the resistance of the gear $g$ upon the parts driven by it, together with the action of the ring $k^2$, tends to force the rollers toward the narrower ends of the pockets, and thus instantly locks the lever-piece and gear together, so that the gear accompanies the lever-piece and is impelled with whatever force is applied to the lever but when the lever begins to turn in the other direction, or if independently of any movement of the lever the gear tends to turn in the direction of the arrow 3 in Fig. 6 with relation to the said lever-piece, it immediately carries the roller toward the wider part of the pockets, releasing their hold upon the lever-piece, so that the gear may at any time turn freely in the direction of the arrow, although it cannot turn in the reverse direction with relation to the lever-piece. The force of the spring $n$ upon the ring $k$ may be adjusted by changing the position of the projection $k^3$, several holes being provided for said projection, as shown at $k^4$, Fig. 8. The ring $k$, rollers $m$, and gear $g$ are retained in position upon the portion $h^3$ of the lever-piece by means of a cap or plate $p$, fastened to the said lever-piece by screws or otherwise.

It is evident from the foregoing that so far as the features of construction thus far described are concerned the gear $g$, and consequently the driving-wheel B connected with it, cannot turn backward or in a direction opposite to the direction in which they are impelled by the levers, except as the levers themselves turn backward, which sometimes causes inconvenience when it is desired to move the vehicle about when the rider is not upon it. This objection is removed by devices which will now be described. It should first be stated, however, that the lever-piece is returned or moved upward when the power or pressure of the foot, by which it was moved to turn the gear $g$, is removed by means of a spring $r$ contained within the hub portion $h^2$ of the lever, (see Figs. 4 and 5,) being connected at one end with the stationary spindle $i$ and at the other end with said hub portion, and the return movement of the levers is limited by stops V, connected with the fork N of the frame-work. In order, however, to disconnect the gear $g$ and lever-piece when the levers are against said stops, so that the wheel B may turn freely backward as well as forward, it is necessary only to move the ring $k^2$ a short distance in the direction of the arrows upon the gear and lever-piece, Fig. 6, just far enough to carry all the rollers to the wider ends of the pockets and retain them there, so that they will not be wedged in if the gear $g$ should be turned backward.

It will be understood that the ring $k$ turns backward and forward with the lever-piece, having only a very slight motion with relation to it, sufficient to lock or unlock the rollers, and consequently it always comes back to the same position when the levers are arrested against their stops. In order to move the ring $k$, so as to relieve the pressure of the rollers when the said levers come to their normal position, the said ring is provided with a notch or shoulder $k^5$, and the retaining-plate $p$ is provided with a recess $p^2$ just over said shoulder, and a dog or stop is connected with the stationary frame-work in such manner that it presses against the plate $p$ at the point at which the recess $p^2$ comes when the lever $h$ is in normal position against its stop V, so that just before the lever $h$ comes up against its stop V the end of said dog passes through the said recess $p^2$ and engages with the shoulder $k^5$ of the ring, stopping the ring from accompanying the lever-piece in the last part of its return movement or just before the lever reaches its stop, so that in the last part of the return movement of the lever-piece the wider part of the pockets is brought opposite the gripping-rollers, relieving the pressure between them and the gear $g$, which may then turn freely in either direction, as the ring $k$ prevents the rollers from moving toward the narrower ends of the pockets or wedging in when the gear $g$ turns backward. This operation will be best understood by referring to Fig. 6, in which it will be seen that if the ring $k^2$ be held stationary while the hub portion of the lever-piece is turned slightly in the direction opposite to the arrow 3 the grip of the rolls $m$ on the ring $g$ will be relieved. The moment, however, that the operator makes the actuating-stroke on the lever, moving the lever-piece in the direction of the arrow 3, the rolls will again grip and carry the ring $g$ with them, also carrying the ring $k^2$, or rather the latter will be actuated from the lever-piece itself by the spring $n$. In this movement of the ring $k^2$, accompanying the lever-piece in making its working-stroke, the shoulder $k^5$ moves away from the dog, which offers no resistance to the movement of the ring in this direction, and almost immediately after the beginning of the actuating-stroke of the lever the recess $p^2$ of the plate $p$, which accompanies the lever, is carried away from beneath the end of the dog $t$, which rises up onto the face of the plate $p$ and bears against the same during the downward and return stroke of the lever until just before the end of the return-stroke, when it will pass through the opening $p^2$ and engage the shoulder $k^5$ of the ring $k^2$, as before described. The dog $t$ is shown in this instance as formed at the end of a spring-strip $t^2$, connected with a plate $t^3$, fastened between the nut $i^3$ and the frame-piece $a$, the elasticity of said strip causing its end to press laterally against the face of the plate $p$, so as to enter the recess and engage the shoulder $k^5$ when said parts come underneath the dog at the end of the return movement of the lever and permitting the said dog to yield or rise up out of the recess and onto the face of the plate $p$ when the lever makes its downstroke. The position of said dog may be adjusted so as to cause it to unlock the rollers at the proper time or just before the levers bring up against the stops V by means of an adjusting-screw $t^4$ (see Figs. 2 and 4) engaging with the frame-piece $a$, the nut $i^3$ being slackened while such adjustment is being made.

So far as the operation of the clutch is concerned it is not necessary that the annulus operated by it should be a gear, as represented at $g$, as the clutch mechanism might be used in any case where an oscillating part is required to move another part with a rotary motion always in one direction, and said annulus might be a gear, as shown, or a sprocket-wheel, or belt-pulley, or any other device to receive rotary motion. It is also obvious that balls might be used instead of the cylinders $m$ in the tapering pockets to lock the lever-piece and annulus together, either one or more of said balls being used in each pocket, as indicated in dotted lines at the top of Fig. 4, and the term "roller," referring to this element, is intended to include balls or spherical rollers as well as cylindrical ones.

The gears $g$ and $c$ are inclosed in a case or shield $u$, divided diametrically into two parts and provided with openings that fit around the hub-piece $h^2$ and plate $p$, as shown in Fig. 3, and with a similar opening to fit around the shaft $b$ inside the gear $c$, so that the gears are completely inclosed and protected from dust or from anything being drawn in between their teeth. The half-sections of the shield $u$ are fastened together by spring-catches.

Referring to Fig. 1 it will be seen that the levers $h$ and their actuating-pedals turn around the axis $i$ in the path indicated by the dotted lines backward, downward, and then forward in their actuating movement, in which they are connected by the running-gear of the vehicle, and from the foregoing description it appears that in making their return movement they are actuated only by the spring $r$ and are practically disconnected from the running-gear. From this it follows that if, owing to the low position of the actuating mechanism adopted in this type of machine, the pedals should strike an obstruction on the ground there would be nothing but the pressure of the rider's foot to overcome, and they would thus readily yield, the obstruction tending to turn them in the direction of their free movement, while with other machines of this type the entire momentum of the vehicle and its rider tend to force the pedals and crank or lever against any obstruction that may be met, thus making it almost certain to produce breakage or damage in case an obstruction is struck by the pedal.

The entire movement of the levers and pedals is at the rear of the axis upon which the pedals turn, so that the front or steering wheel A need be set forward only far enough to clear in its oscillating or steering movement the gears $g$ and their inclosing-cases, thus enabling the wheels to be set nearer together and the entire vehicle to be made shorter than those of this type employing the revolving-crank motion, in which the forward wheel A has to be set far enough forward to clear the cranks and pedals when in their most advanced position.

In order to avoid any possibility of confusion as to the operation of the ratchet-clutch mechanism, it should be stated that the clutch shown in Fig. 2 is the one on the right-hand side of the vehicle as seen looking from the left-hand side, and the one shown in Fig. 3 is the one on the right-hand side of the machine as seen looking from the front to the rear. The one shown in Fig. 4 is the one on the left-hand side of the machine as seen looking from the rear toward the front of the machine. Fig. 5 is the same as seen looking toward the left-hand side of the machine, and Figs. 6 and 7 parts of the same as seen looking from the right-hand side of the machine, using the terms "right hand" and "left hand" with relation to a person seated on the machine in the natural position.

We claim—

1. A bicycle comprising a front steering and rear driving wheel, a fork embracing the front wheel and provided with bearings therefor, and a frame pivotally connected with said fork and extending to the bearings for the rear wheel, actuating-levers supported on the said frame, one at each side and in advance of the periphery of the rear wheel, said levers swinging downward at the rear of their pivots in making the actuating-stroke and swinging upward and rearward in making their return-stroke, gears, and clutches connecting the same with said levers in the downward and not in the upward movement thereof, said gears being connected with the rear driving-wheel of the vehicle, substantially as described.

2. A bicycle comprising a front steering and rear driving wheel, a fork embracing the front wheel and provided with bearings therefor, and a frame pivotally connected with said fork and extending to the bearings for the rear wheel, a post extending upward from said frame for a seat-support and an arm extending downward therefrom, a fork at its lower end, a bearing-piece connected with the ends of said fork, and a shaft turning in said bearing-pieces provided with gears, said shaft being also connected with the rear driving-wheel, stationary spindles supported in said bearing-pieces and actuating-levers pivoted to vibrate on said spindles, gears concentric with said levers meshing with the gears on said shaft, and a clutch-connection between said levers and gears, substantially as described.

3. The actuating lever-piece having a portion provided with inclined recesses, a spring-pressed ring having projections corresponding in number to said recesses, an annulus surrounding said ring, and rollers inclosed in the pockets formed between the said annulus, the surface of said inclined recesses, and the projections of said ring, a stop limiting the movement of the said lever in one direction, and a dog or stop engaging the said ring and arresting the movement thereof with the lever just before the lever is arrested by its stop, substantially as and for the purpose described.

4. The actuating lever-piece having a portion provided with inclined recesses, a spring-pressed ring having projections corresponding in number to said recesses, an annulus surrounding said ring, and rollers inclosed in the pockets formed between the said annulus, the surface of said inclined recesses, and the projections of said ring, and a support for one end of the spring that acts on said ring, capable of adjustment with relation to said ring, substantially as and for the purpose described.

5. The actuating lever-piece having a portion provided with inclined recesses, a spring-pressed ring having projections corresponding in number to said recesses, an annulus surrounding said ring, and rollers inclosed in the pockets formed between the said annulus, the surface of said inclined recesses, and the projections of said ring, said ring being movable in opposition to the spring-pressure thereon for the purpose of removing the rollers from engagement between said annulus and lever-piece, substantially as described.

In testimony whereof we have signed our names to this specification in the presence of two subscribing witnesses.

JOSEPH B. McCUNE.
JOS. L. YOST.

Witnesses:
JOS. P. LIVERMORE,
M. E. HILL.